(12) United States Patent
Chmiel et al.

(10) Patent No.: US 8,935,241 B2
(45) Date of Patent: Jan. 13, 2015

(54) USING GEOGRAPHICAL LOCATION TO DETERMINE ELEMENT AND AREA INFORMATION TO PROVIDE TO A COMPUTING DEVICE

(75) Inventors: Matthew S. Chmiel, Ottawa (CA); Jason Hiltz-Laforge, Ottawa (CA); Alireza Pourshahid, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 13/610,535

(22) Filed: Sep. 11, 2012

(65) Prior Publication Data
US 2013/0117333 A1 May 9, 2013

Related U.S. Application Data

(63) Continuation of application No. 13/293,068, filed on Nov. 9, 2011, now abandoned.

(51) Int. Cl.
*G06F 17/30* (2006.01)
*G06Q 30/02* (2012.01)

(52) U.S. Cl.
CPC ........ *G06Q 30/0201* (2013.01); *G06F 17/3087* (2013.01); *G06F 17/30241* (2013.01)
USPC .......................... 707/724; 707/788; 455/456.1

(58) Field of Classification Search
USPC ........................... 707/724, 788; 455/456, 457
See application file for complete search history.

(56) References Cited

U.S. PATENT DOCUMENTS

| | | | |
|---|---|---|---|
| 6,611,751 | B2 | 8/2003 | Warren |
| 7,376,640 | B1 | 5/2008 | Anderson et al. |
| 7,574,606 | B1 | 8/2009 | Fan et al. |
| 7,848,765 | B2 * | 12/2010 | Phillips et al. ............. 455/456.3 |
| 7,865,308 | B2 | 1/2011 | Athsani et al. |
| 8,170,580 | B2 | 5/2012 | Dingler et al. |
| 8,255,392 | B2 | 8/2012 | Melton |
| 2003/0069024 | A1 | 4/2003 | Kennedy, Jr. |

(Continued)

FOREIGN PATENT DOCUMENTS

WO 2011011616 1/2011

OTHER PUBLICATIONS

Information Materials for IDS, dated Apr. 2, 2013, pp. 1-4.

(Continued)

*Primary Examiner* — Khanh Pham
(74) *Attorney, Agent, or Firm* — David W. Victor; Konrad, Raynes, Davda and Victor LLP

(57) ABSTRACT

A database has a plurality of elements, where each element is associated with a location and at least one set of different attribute values, wherein each set includes a timestamp when the attribute values in the set were determined. A determination is made of a reference geographical location, an element having a geographical location within a geographical region including the referenced geographical location, a most recent set of the attribute values for the element having a most recent timestamp, a previous set of attribute values for the determined element comprising the set of attribute values having a previous timestamp prior to the most recent timestamp, and whether a condition with respect to at least one of the most recent set of attribute values and the previous set of attribute values of the determined element is satisfied.

24 Claims, 11 Drawing Sheets

(56) References Cited

U.S. PATENT DOCUMENTS

| | | | |
|---|---|---|---|
| 2004/0192339 A1 | 9/2004 | Wilson et al. | |
| 2006/0009194 A1 | 1/2006 | Ross | |
| 2007/0202844 A1* | 8/2007 | Wilson et al. | 455/404.2 |
| 2008/0235040 A1 | 9/2008 | Ratliff et al. | |
| 2009/0000369 A1 | 1/2009 | Sanpitak | |
| 2010/0306233 A1 | 12/2010 | Zheng | |
| 2011/0022540 A1 | 1/2011 | Stern et al. | |

OTHER PUBLICATIONS

German Communication dated Mar. 22, 2013, 1 pp.
German Office Action dated Feb. 25, 2013, pp. 1-7.
Examination Report for Application No. GB1220037.4, dated Mar. 28, 2013, pp. 1-6.
Office Action dated Mar. 7, 2013, for U.S. Appl. No. 13/293,068, filed Sep. 11, 2011, invented by Matthew Chmiel et al., pp. 1-23.
Notice of Allowance 1, Jul. 23, 2013, for U.S. Appl. No. 13/293,068, filed Nov. 9, 2011 by M.S. Chmiel et al., Total 10 pp. [54.74 (NOA1)].
Response to Office Action, dated May 31, 2013. For U.S. Appl. No. 13/293,068 (54.74), filed Sep. 11, 2011, invented by Matthew Chmiel et al., Total 13 pp.
US Patent Application, dated Jan. 15, 2014, for U.S. Appl. No. 14/156,363 (54.74C2), filed Jan. 15, 2013, invented by Matthew Chmiel et al., Total 44 pp.
Preliminary Amendment, dated Jan. 15, 2014, for U.S. Appl. No. 14/156,363 (54.74C2), filed Jan. 15, 2013, invented by Matthew Chmiel et al., Total 9 pp.
Germanakos, P. and C. Mourlas, "Adaptation and Personalization of Web-based Multimedia Content", In Multimedia Transcoding in Mobile and Wireless Networks, 2008, Total 29 pp.
Hinze, A. and A. Voisard, "Location- and Time-Based Information Delivery in Tourism", In Proceedings of the 8th International Symposium in Spatial and Temporal Databases, 2003, Total 18 pp.
Ionescu, D., "Geolocation 101: How it Works, The Apps, and Your Privacy", [online], Mar. 29, 2010, Available online at <URL: http://www.pcworld.com/article/192803/geolocation_101_how_it_works_the_apps_and_your_privacy.html>, Total 4 pp.
Jensen, C.S., A. Kligys, T.B. Pedersen, and I. Timko, "Multidimensional Data Modeling for Location-Based Services", The VLDB Journal, vol. 13, No. 1, Jan. 2004, Total 21 pp.
Latkiewicz, M., "Going Places Beyond Foursquare, Gowalla, and Yelp: 5 Location-Aware Apps You Haven't Heard of", [Online], Feb. 21, 2011, [Retrieved on Aug. 25, 2011], Retrieved from the Internet at <URL: http://smartblogs.com/socialmedia/2011/02/21/location-aware-apps-going-places-beyond-foursquare-gowalla-and-yelp/>, Total 2 pp.
Lin, D., "Location-Based Social Media for Brands", Proximity Singapore, [Online], May 2010, Available online at <URL: http://www.slideshare.net/dlin5/geo-loc-services01-4491918>, Total 20 pp.
Mell, P. and T. Grance, "The NIST Definition of Cloud Computing (Draft)", Recommendations of the National Institute of Standards and Technology, Special Publication 800-145 (Draft), Jan. 2011, Total 7 pp.
Rajdash, "8 Mobile Geo-Location Application Types", [Online], Apr. 22, 2010, Available online at <URL: http://socialtimes.com/8-mobile-geo-location-application-types_b11201>, Total 4 pp.
Reed, R., "10 Ways Geolocation is Changing the World", [Online] Jul. 29, 2010, Retrieved from the Internet at <URL: http://www.socialbrite.org/2010/07/29/10-ways-geolocation-is-changing-the-world/>, Total 4 pp.
Socialight, "Socialight", [online], © 2011, Available online at <URL: http://www.socialight.com/>, Total 2 pp.
Taylor, C.A., "Adaptive Mobile Content Personalization", [online], Winter 2007, University of Washington, Department of Technical Communication, © TC 496/596: Emerging Mobile Technologies, Available online at <URL: http://courses.washington.edu/mobileux/documents/adaptive-full.pdf>, Total 12 pp.
Thomasnet, "BI Software Combines Time and Location-Based Analysis", [online], Jun. 25, 2007, [Retrieved on Aug. 25, 2011], Available online at <URL: http://news.thomasnet.com/fullstory/BI-Software-combines-time-and-location-based-analysis-803641>, Total 7 pp.
Wikipedia, "Brightkite", [online], Last Modified Jul. 10, 2011, Retrieved from the Internet at <URL: http://en.wikipedia.org/wiki/Brightkite>, Total 3 pp.
Wikipedia, "Business Analytics", [online], Last Modified Jul. 20, 2011, [Retrieved on Oct. 2, 2011], Retrieved from the Internet at <URL: http://en.wikipedia.org/wiki/Business_analytics>, Total 3 pp.
Wikipedia, "Context Awareness", [online], Last Modified Jul. 21, 2011, Retrieved from the Internet at <URL: http://en.wikipedia.org/wiki/Context_awareness>, Total 5 pp.
Wikipedia, "Facebook Features", [online], Last Modified Aug. 25, 2011, Retrieved from the Internet at <URL: http://en.wikipedia.org/wiki/Facebook_features>, Total 17 pp.
Wikipedia, "Foursquare (Website)", [online], Last Modified Aug. 24, 2011, Retrieved from the Internet at <URL: http://en.wikipedia.org/wiki/Foursquare_(website)>, Total 9 pp.
Wikipedia, "Geo (Marketing)", [online], Last Modified May 25, 2011, Retrieved from the Internet at <URL: http://en.wikipedia.org/wiki/Geo_(marketing)>, Total 3 pp.
Wikipedia, "Geolocation Software", [online], Last Modified Aug. 23, 2011, Retrieved from the Internet at <URL: http://en.wikipedia.org/wiki/Geolocation_software>, Total 5 pp.
Wikipedia, "Geoloqi", [online], Last Modified Jul. 22, 2011, Retrieved from the Internet at <URL: http://en.wikipedia.org/wiki/Geoloqi>, Total 2 pp.
Wikipedia, "Geomium", [online], Last Modified Jul. 29, 2011, Retrieved from the Internet at <URL: http://en.wikipedia.org/wiki/Geomium>, Total 1 p.
Wikipedia, "Geotagging", [online], Last Modified Aug. 11, 2011, Retrieved from the Internet at <URL: http://en.wikipedia.org/wiki/Geotagging>, Total 8 pp.
Wikipedia, "Geotargeting", [online], Last Modified Aug. 10, 2011, Retrieved from the Internet at <URL: http://en.wikipedia.org/wiki/Geotargeting>, Total 4 pp.
Wikipedia, "Google Latitude", [online], Last Modified Jul. 14, 2011, Retrieved from the Internet at <URL: http://en.wikipedia.org/wiki/Google_Latitude>, Total 3 pp.
Wikipedia, "Gowalla", [online], Last Modified Aug. 8, 2011, Retrieved from the Internet at <URL: http://en.wikipedia.org/wiki/Gowalla>, Total 3 pp.
Wikipedia, "Hotlist", [online], Last Modified Sep. 30, 2011, Retrieved from the Internet at <URL: http://en.wikipedia.org/wiki/Hotlist>, Total 3 pp.
Wikipedia, "Koprol", [online], Last Modified Mar. 23, 2011, Retrieved from the Internet at <URL: http://en.wikipedia.org/wiki/Koprol>, Total 3 pp.
Wikipedia, "List of Social Networking Websites", [online], Last Modified Oct. 2, 2011, Retrieved from the Internet at <URL: http://en.wikipedia.org/w/index.php?title=List_of_Social_Networking_Websites&oldid=453510786>, Total 19 pp.
Wikipedia, "Location-based Service", [online], Last Modified Aug. 5, 2011, Retrieved from the Internet at <URL: http://en.wikipedia.org/wiki/Location-based_service>, Total 8 pp.
Wikipedia, "Loopt", [online], Last Modified Jul. 1, 2011, Retrieved from the Internet at <URL: http://en.wikipedia.org/wiki/Loopt>, Total 6 pp.
Wikipedia, "Mobile Phone Tracking", [online], Last Modified Aug. 25, 2011, Retrieved from the Internet at <URL: http://en.wikipedia.org/wiki/Mobile_Phone_Tracking>, Total 5 pp.
Wikipedia, "SCVNGR", [online], Last Modified Aug. 15, 2011, Retrieved from the Internet at <URL: http://en.wikipedia.org/wiki/SCVNGR>, Total 2 pp.
Wikipedia, "Socialight", [online], Last Modified Mar. 23, 2011, Retrieved from the Internet at <URL: http://en.wikipedia.org/wiki/Socialight>, Total 1 p.
Wikipedia, "The Hotlist", [online], Last Modified May 24, 2011, Retrieved from the Internet at <URL: http://en.wikipedia.org/wiki/The_Hotlist>, Total 3 pp.
U.S. Appl. No. 13/293,068, filed Nov. 9, 2011, entitled "Using Geographical Location to Determine Element and Area Information to

(56) References Cited

OTHER PUBLICATIONS

Provide to a Computing Device", invented by Chmiel, M.S., J. Hiltlaforge, A. Pourshahid, and G.A. Watts, Total 46 pp. [54.74 (Appln)].
Preliminary Amendment, Sep. 11, 2012, for U.S. Appl. No. 13/293,068, filed Nov. 9, 2011 by M.S. Chmiel et al., Total 9 pp. [54.74 (PrelimAmend)].

A. Escribano et al., "A GIS-OLAP Implementation", dated Nov. 9, 2007, The University of Buenos Aires, total 8 pages.

Qingling, L., et al, "Analysis and Design of CRM DSS Based on GIS" dated 2003, total 4 pages.

B. Wang et al., "Efficient OLAP Operations for Spatial Data Using Peano Tres", dated Jun. 13, 2003, Computer Science Department North Dakota State University, total 8 pages.

* cited by examiner

Element Information

Set of Attribute Values

Area Information Instance

Set of Area Attribute Values

Element Attribute Condition

Area Attribute Condition

USING GEOGRAPHICAL LOCATION TO DETERMINE ELEMENT AND AREA INFORMATION TO PROVIDE TO A COMPUTING DEVICE

CROSS-REFERENCE TO RELATED APPLICATION

This application is a continuation of U.S. patent application Ser. No. 13/293,068, filed Nov. 9, 2011, which application is incorporated herein by reference in its entirety.

BACKGROUND OF THE INVENTION

1. Field of the Invention

The present invention relates to a computer program product, system, and method for using geographical location to determine element and area information to provide to a computing device.

2. Description of the Related Art

Business analytics (BA) refers to the skills, technologies, applications and practices for continuous iterative exploration and investigation of past business performance to gain insight into customer data and use the information on customer patterns and data to develop business plans and direct sales efforts. Business analytics focuses on developing new insights and understanding of business performance based on data and statistical methods. Business analytics may utilize data, statistical and quantitative analysis, explanatory and predictive modeling, data mining and fact-based management to drive decision making Analytics may be used as input for human decisions or automated decision processes.

Business analytic systems analyze data and provide business intelligence in the form of reports or other representations of business intelligence data that is often provided in a set of predefined data for the end users. An average business user often is limited to these authored reports There is a need in the art for improved techniques for determining business intelligence from gathered business data.

SUMMARY

Provided are a computer program product, system, and method for using geographical location to determine element and area information to provide to a computing device. A database has a plurality of elements, where each element is associated with a location and at least one set of different attribute values, wherein each set includes a timestamp when the attribute values in the set were determined. A determination is made of a reference geographical location, an element having a geographical location within a geographical region including the referenced geographical location, a most recent set of the attribute values for the element having a most recent timestamp, a previous set of attribute values for the determined element comprising the set of attribute values having a previous timestamp prior to the most recent timestamp, and whether a condition, specifying a criteria for at least one of the most recent set of attribute values and the previous set of attribute values of the determined element, is satisfied. Information is rendered on at least one of the attribute values in at least one of the most recent set and the previous set of the determined element in response to determining that the condition is satisfied.

DETAILED DESCRIPTION

Described embodiments provide techniques to store and mange time related attributes of elements representing customers at geographical locations and time related information on area attributes of geographical regions. A reference geographical location may be determined from a portable computing device or other input and a determination may be made of elements within a geographical region including the reference geographical location. The elements may be processed to determine elements, representing customers, at geographical locations within the geographical region that satisfy conditions with respect to the attribute values of the elements determined at a most recent time and to the attribute values determined at a previous time prior to the most recent time. A determination may further be made of area attribute values maintained in area information for the geographical region including the reference geographical location, and a determination may be made of area attributes relevant to the area attributes of elements in the geographical region to present relevant area attribute values.

Figure 1:
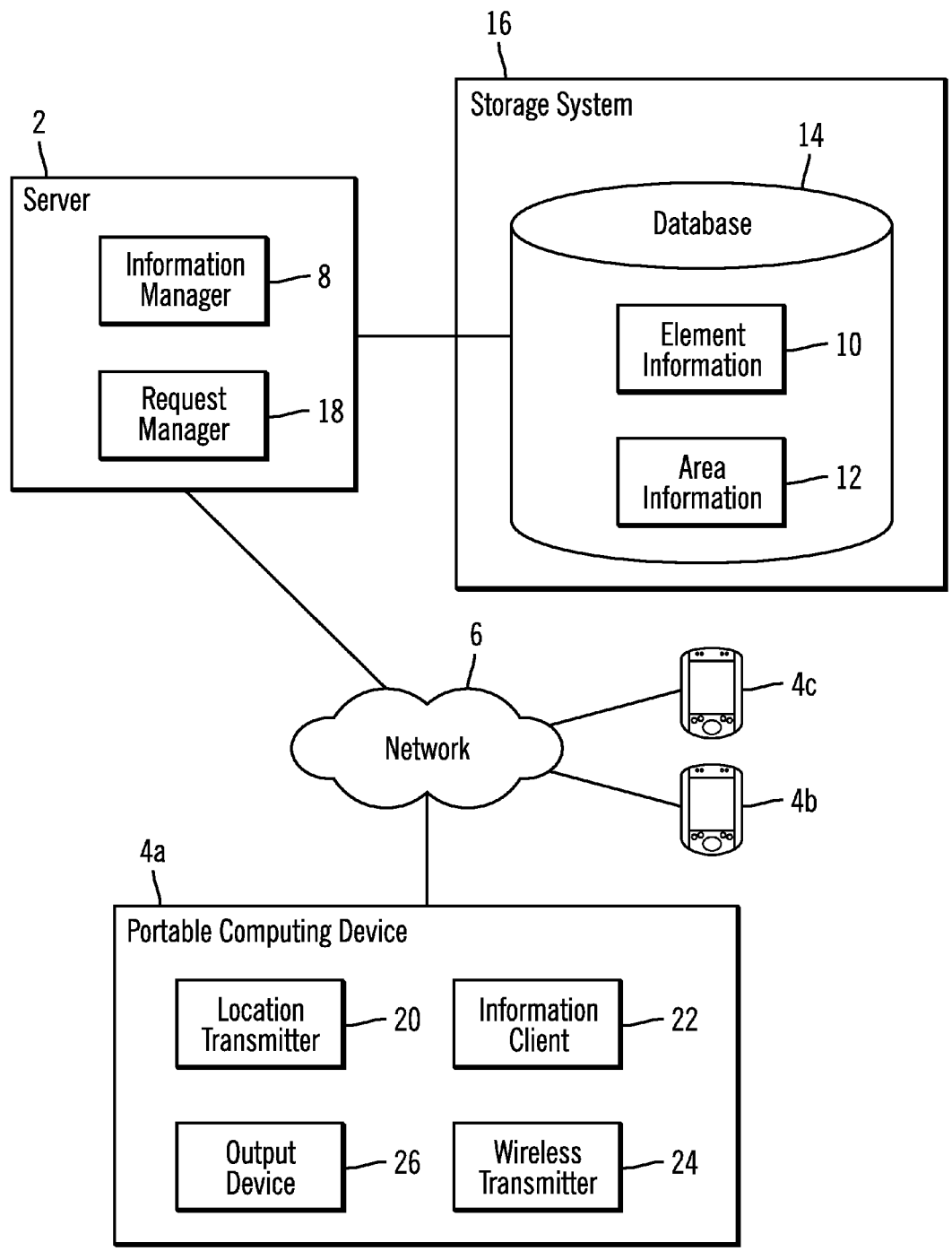
FIG. 1 illustrates a computing environment in which embodiments are implemented.

FIG. 1 illustrates an embodiment of a network computing environment having a server 2 and portable computing devices 4a, 4b, 4c that communicate over a network 6. The server 2 includes an information manager 8 to access element information 10 and area information 12 maintained in a database 14 implemented in a storage system 16 and a request manager 18 to handle requests for element information 10 and/or area information 12 in the database 14.

The element information 10 may comprise information on elements at different geographical locations, such as customers, including residential and commercial customers. The area information 12 may include information about geographical regions, such as demographics, crime statistics, income levels, etc., that may be relevant to services provided to the customers represented in the element information 10.

Each portable computing device 4a, 4b, 4c may include a location transmitter 20 to determine and transmit location information, such as Global Positioning System (GPS) location, an information client 22 to communicate with the request manager 18 to access element 10 and area 12 information from the information manager 8, a wireless transmitter 24 to communicate with the server 2 over the network 6, and an output device 26, such as a display screen and/or audio speakers, to render element and area information the information client 22 requests from the information manager 8.

The server 2 may comprise a server class computing device capable of servicing requests from multiple connected clients, such as portable computing devices 4a, 4b, 4c. The portable computing devices 4a, 4b, 4c may comprise any type of portable computing device, such as a smart phone, tablet computing device, telephony device, laptop computer, portable device capable of being mounted in an automobile, etc.

The storage system 16 may comprise one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc. The network 6 may comprise a local area network (LAN), storage area network (SAN), wide area network (WAN), a wireless network, the Internet, etc. The network 6 may include wireless network routers and may be part of a cloud computing model. The request manager 18 may comprise a manager capable of servicing requests from multiple connected clients 4a, 4b, 4c, such as a Hypertext Transport Protocol (HTTP) server, Simple Mail Transport Protocol (SMTP), etc.

The information manager 8 and information client 22 may comprise software programs in a memory executed by a processor. In an alternative embodiment, some portion or all of the programs may be implemented in a hardware component, such as a dedicated integrated circuit, e.g., Application Specific Integrated Circuit (ASIC), expansion card, etc.

Figure 2:
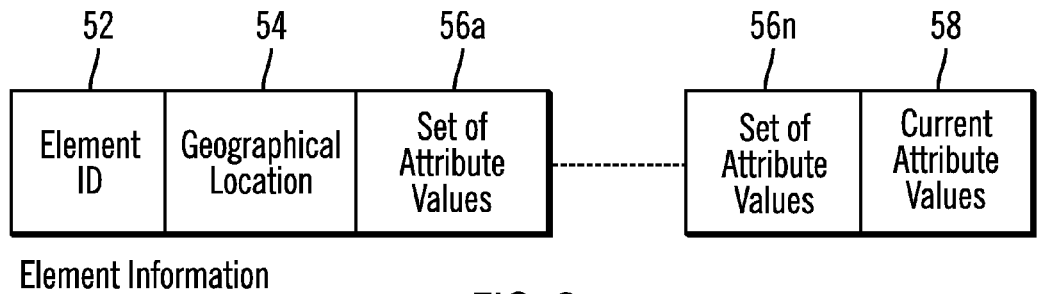
FIG. 2 illustrates an embodiment of element information.

FIG. 2 illustrates an embodiment of an instance of element information 50 maintained in the element information 10 in the database 14 for an element in a geographical region for which information is maintained. The element information 50 includes an element identifier 52; a geographical location 54 of the element, such as GPS coordinates, street address, etc.; a set of attribute values $56a \ldots 56n$, each set providing values for certain attributes of the element 52 at different points-in time; and current attribute values 58 providing currently or recently determined attribute values for the element 52. The current attribute values 58 may be periodically updated as a result of obtaining new information on an element from user input, by querying databases to obtain new attribute information, or by receiving automated information updates.

Figure 3:
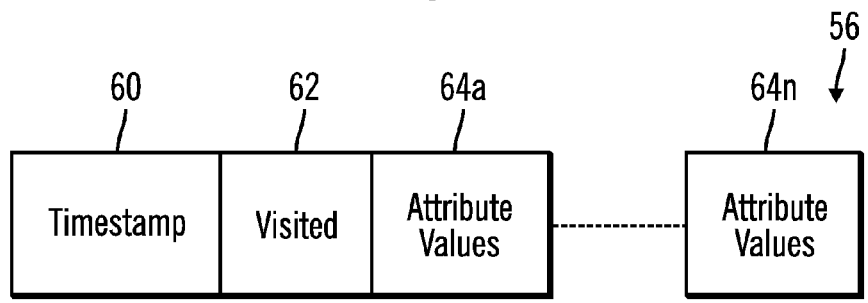
FIG. 3 illustrates an embodiment of a set of attribute values in the element information.

FIG. 3 illustrates an embodiment of information included in a set of attribute values 56, such as the sets $56a \ldots 56n$, including a timestamp 60 indicating a time the attribute values $64a \ldots 64n$ were recorded, a visited attribute 62 indicating a time the element was last visited or serviced, and the saved attribute values $64a \ldots 64n$. The visited attribute 62 may indicate the time a customer representative visited the location of the element or a time the element was remotely serviced over a computer network or telephone. The visited 62 attribute may indicate a time and identifier of the customer service representative that last visited/serviced the element.

In one embodiment, the elements 50 may comprise data structure constructs representing customers, people, households, businesses, entities, etc. having attributes of the represented entity. The attribute values maintained in the sets $56a \ldots 56n$ and the current attribute values 58 may include profile attributes, i.e., number of persons working or residing at location, products purchased, date of purchase, income, demographic information, profession, business type, last time purchase made, last time a salesman or customer representative visited or serviced the element, etc. For instance, if the portable computing devices 4a, 4b, 4c are used by salesman or customer representative visiting the elements, e.g., customers, in the field, then the attribute values may include specific information that could be relevant to the customer representative using the portable computing device 4a, 4b, 4c while visiting customers. Further, the elements 50 may represent physical objects having a fixed or variable geographical location, such as a building, automobile, computer, appliance or other type of product that requires upgrades, replacement parts and continual servicing.

Figure 4:
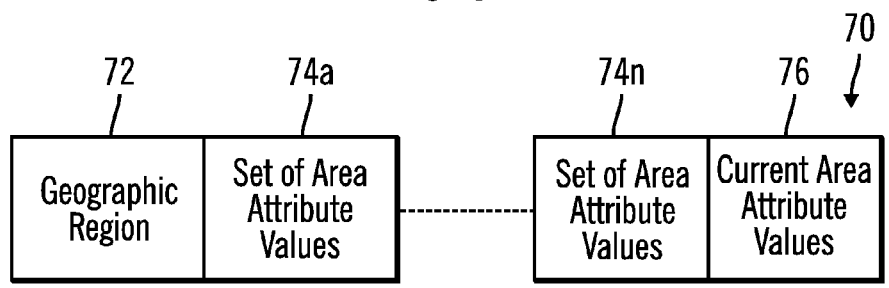
FIG. 4 illustrates an embodiment of an area information instance.

FIG. 4 illustrates an embodiment of an area information instance 70 maintained in the area information 12 in the database 14. An area information instance 70 identifies a geographic region 72, such as identified by GPS or other geographical boundaries, one or more sets of area attribute values $74a \ldots 74n$, each providing values for certain attributes of the area at different points-in time; current area attribute values 78 providing currently or recently determined attribute values for the area represented by the geographic region 72. The current area attribute values 76 may be periodically updated as a result of obtaining new information on the area from user input, by querying databases to obtain new attribute information, or by receiving automated information updates.

Figure 5:
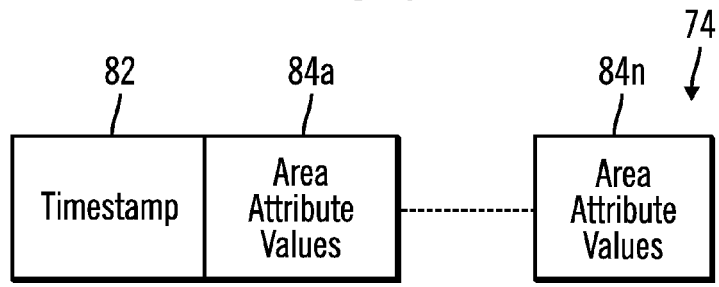
FIG. 5 illustrates an embodiment of a set of are attribute values in the area information instance.

FIG. 5 illustrates an embodiment of information included in a set of area attribute values 74, such as the sets $74a \ldots 74n$, including a timestamp 82 indicating a time the area attribute values $84a \ldots 84n$ were recorded, and the area saved attribute values $84a \ldots 84n$.

The area attribute values $84a \ldots 84n$ may include attributes of the geographical region 72 relevant to the business and products the user of the server 2 is selling to customer elements. For instance, the area attributes may include general economic and social trends for the area, such as housing prices, local economic growth trends, regional economy, population, crime statistics, number of families, age breakdowns, natural disaster risks or occurrences, etc. The purpose of the area information 12 is to provide information to the user of the portable computing devices 4a, 4b, 4c on attributes of the region that may be relevant to the customers, represented by elements 50, being serviced in the region.

Figure 6:
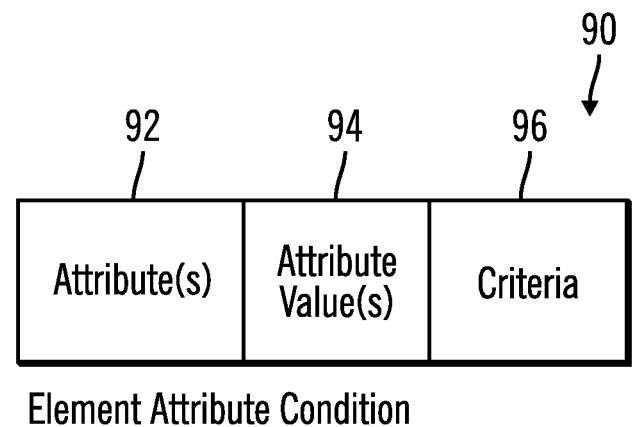
FIG. 6 illustrates an embodiment of an element attribute condition.

FIG. 6 illustrates an embodiment of element attribute conditions 90 applied by the information manager 8 to select elements 58 to present to the user of the portable computing device 4a, 4b, 4c, including one or more attributes 92 of the elements to which the condition applies, an attribute value 94 for one or more of the attributes values of the elements, and a criteria 96 applied to the attribute value 94, wherein the condition checks whether the attribute value 94 satisfies the criteria 96.

Figure 7:
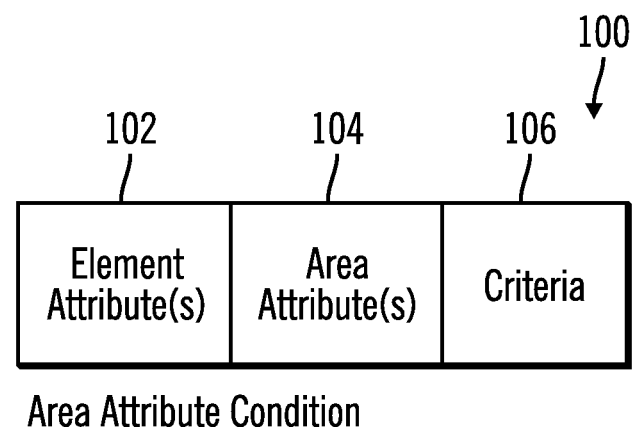
FIG. 7 illustrates an embodiment of an area attribute condition.

FIG. 7 illustrates an embodiment of an area attribute condition 100 applied by the information manager 8 to determine elements 50 and area attributes $84a \ldots 84n$ of the area information for the geographical region including the elements that satisfy a criteria 106 with respect to one or more element attributes 102 and one or more area attributes 104. The condition may look for area attribute values that match element attribute values or provide a relevance check, such as using matching terms, data mining techniques, and analysis to determine area attributes relevant to element attributes of the elements to present to the user of the portable computing device 4a, 4b, 4c.

Figure 8:
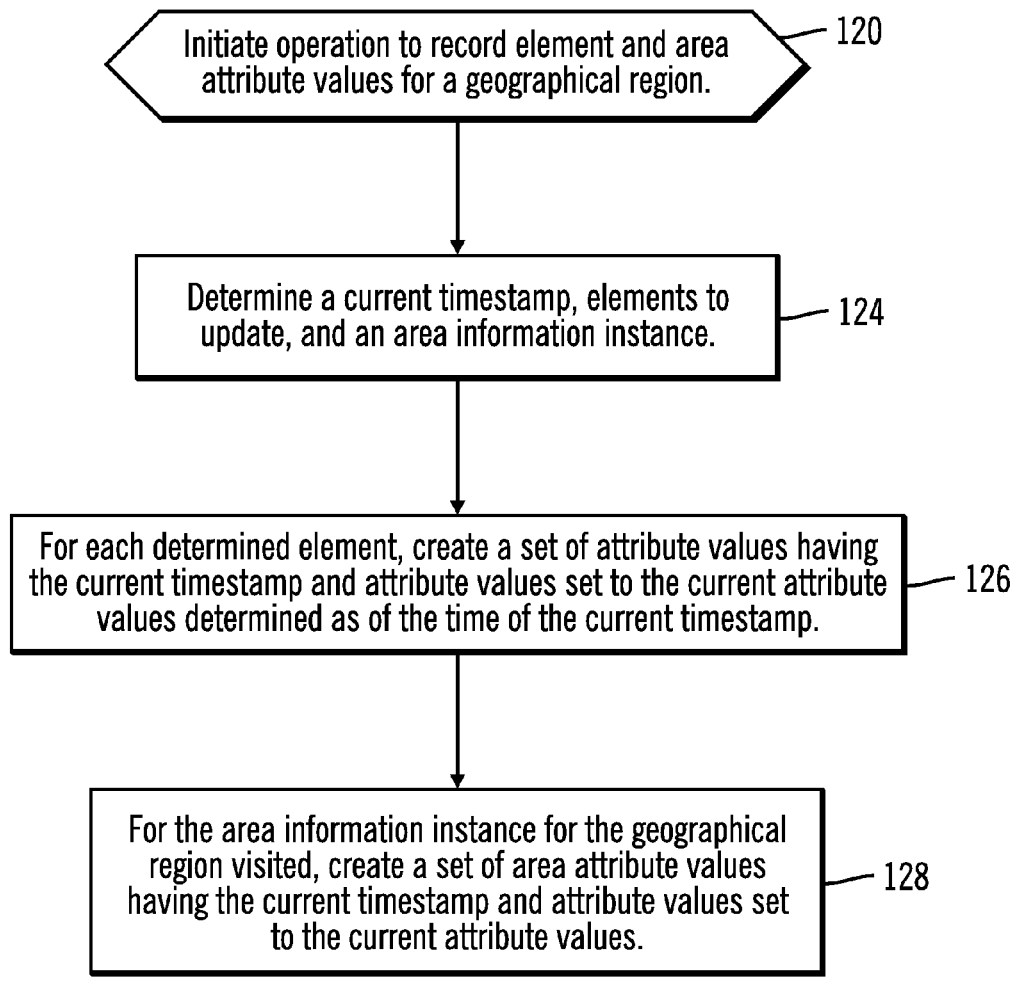
FIG. 8 illustrates an embodiment of operations to record element and area attribute values.

FIG. 8 illustrates an embodiment of operations performed by the information manager 8 or information client 22 to record the sets of element 56a . . . 56n and area 74a . . . 74n attribute values for a current time. Upon initiating (at block 120) the operation to record set element and area attribute values, the information manager 8 determines (at block 124) a current timestamp, attribute values of elements to update, such as elements within a provided geographical region, and attributes of an area information instance for the geographical region. The operation may be initiated in response to a command, receiving new attribute information, part of a scheduled update, or performed after a user of a portable computing device 4a, 4b, 4c, such as a customer service representative, visits a geographical region. For each determined element, the information manager 8 creates (at block 126) a set of attribute values 56 (FIG. 3) having the current timestamp 60, a time the elements were last visited 62, and attribute values 64a . . . 64n set to the current attribute values 58 determined as of the time of the current timestamp. For the area information instance 70 for the geographical region, the information manager 8 creates (at block 128) a set of area attribute values 74 (FIG. 5) having the current timestamp 82 and area attribute values 84a . . . 84n set to the current area attribute values. The attribute values that are added to the element and area sets may be determined and entered by a user of the portable computing device 4a, 4b, 4c using the device 4a, 4b, 4c, retrieved from a database or external source or otherwise determined and entered.

Figure 9:
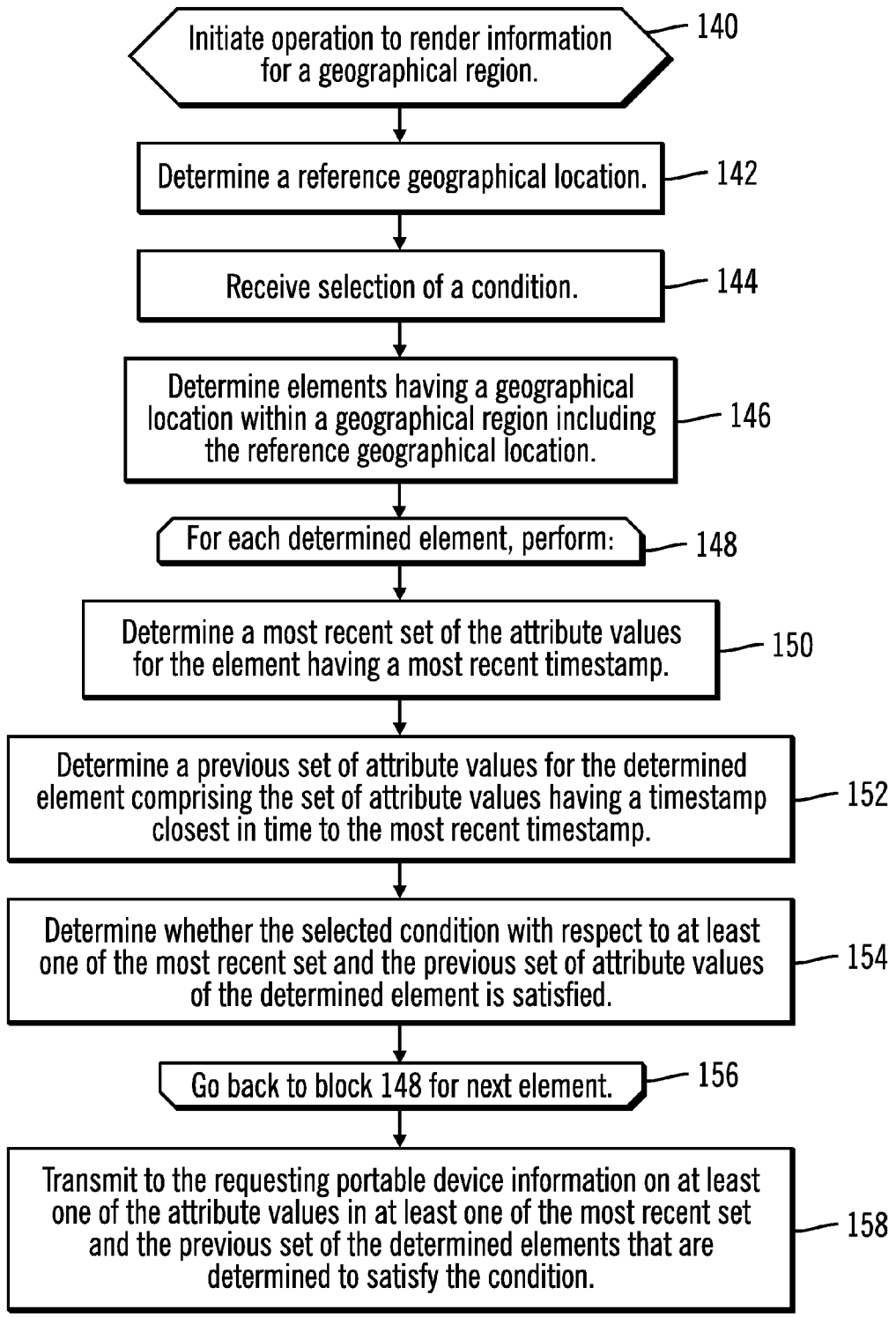
FIG. 9 illustrates an embodiment of operations to render information for a geographical region.

FIG. 9 illustrates an embodiment of operations performed by the information manager 8 or information client 22 to render information for a geographical region. The request for the information may initiate from a portable computer device 4a, 4b, 4c transmitting a request for information received by the request manager 18 at the server 2. Upon initiating (at block 140) the operation, the information server 8 determines (at block 142) a reference geographical location, which may comprise the current geographical location of the portable computing device 4a, 4b, 4c as determined by the location transmitter 20 and sent to the server 2. The information manager 8 then receives (at block 144) selection of one or more element attribute conditions 90 to use to select elements according to the condition criteria 96. A determination is then made (at block 146) of elements 50 having a geographical location 54 within a geographical region including the reference geographical location. The geographical region may be based on groups of predefined regions or an area defined by a perimeter surrounding the current portable computing device 4a, 4b, 4c. The information manager 8 then performs a loop of operations at blocks 148 through 156 for each determined element in the geographical region. At block 150, the information manger 8 determines a most recent set of the attribute values $56_n$ for the element having a most recent timestamp 60. In one embodiment, the recent set of attribute values $56_n$ may include a set created as part of the operations of FIG. 8 which would have been initiated for the request initiated at block 140. A previous set of attribute values $56_{n-1}$ is determined (at block 152) for the determined element comprising the set of attribute values $56_{n-1}$ having a timestamp 60 before the most recent timestamp in the most recent set (n) of attribute values. In one embodiment, the timestamp of the previous set is the timestamp closest in time to the most recent timestamp, which would be the (n-1)th set of attribute values. The information manager 8 then determines (at block 154) whether a criteria 96 of the selected condition 90, selected at block 144, with respect to at least one of the most recent set and the previous set of attribute values of the determined element, is satisfied. The determination at block 154 may be made with respect to multiple conditions to determine elements having attributes that satisfy the criteria 96 of multiple conditions 90. The information manager 8 transmits (at block 158) to the requesting portable device 4a, 4b, 4c information on at least one of the attribute values in at least one of the most recent set and the previous set of the determined elements that satisfy the condition.

For instance, the condition may specify criteria to select consumers, represented by elements, having product attributes indicating the purchase of certain products within a certain amount of time, or that have purchased products between a current time and a most recent time, etc. The condition 90 may provide a purchasing criteria that selects consumers having product attributes indicating: a potential for purchasing a new product; that the customer needs to purchase a replacement product based on attributes of the products purchased and the timestamp of the purchase in the previous set of attributes; a valued customer based on products purchased and a purchasing threshold as indicated in the attributes in at least one of the most recent and previous sets; and a change of a profile characteristic of the customer at the geographical location of the customer element.

Figure 10:
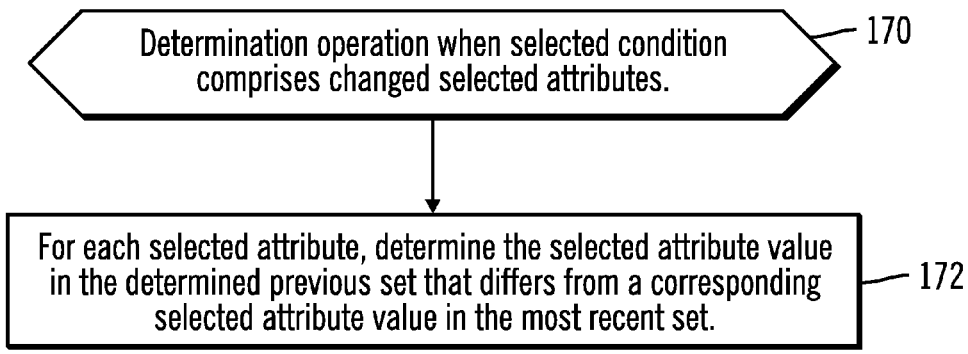
FIG. 10 illustrates an embodiment of operations to determine elements when the condition criteria selects elements having changed attributes.
Figure 11:
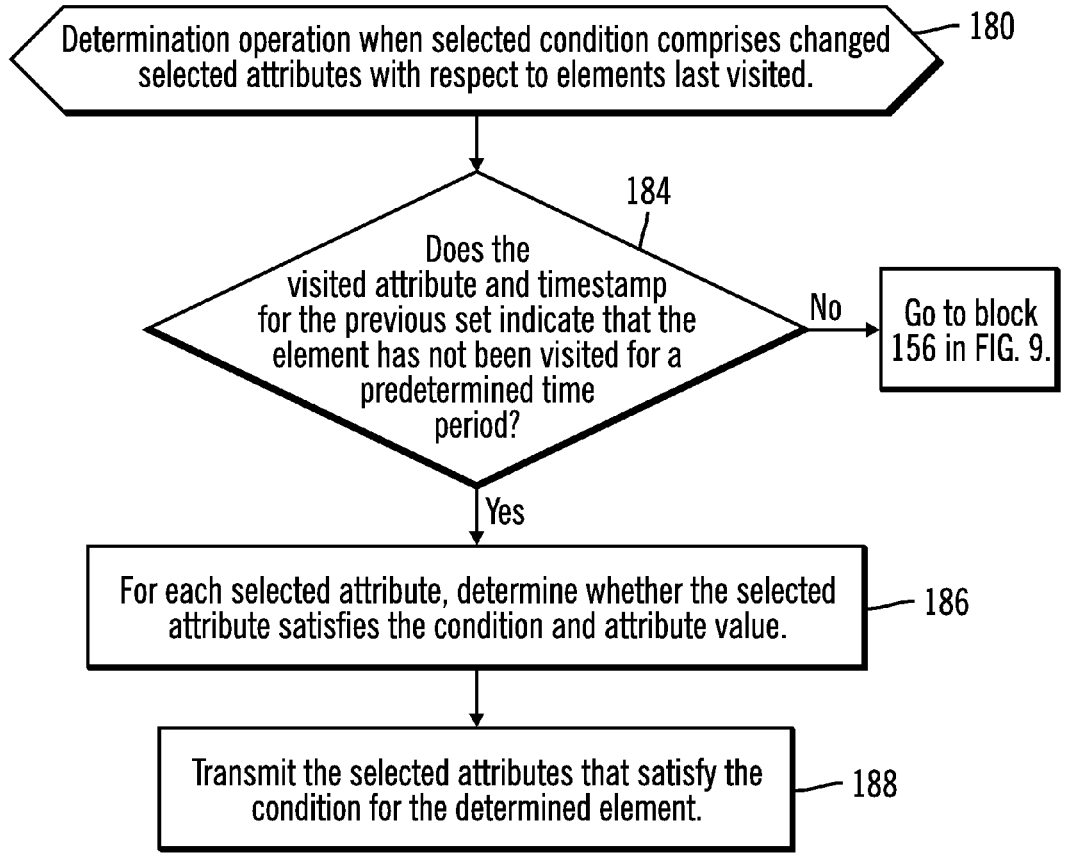
FIG. 11 illustrates an embodiment of operations to determine elements when the condition criteria selects elements having attributes indicating that the element was last visited or serviced.
Figure 12:
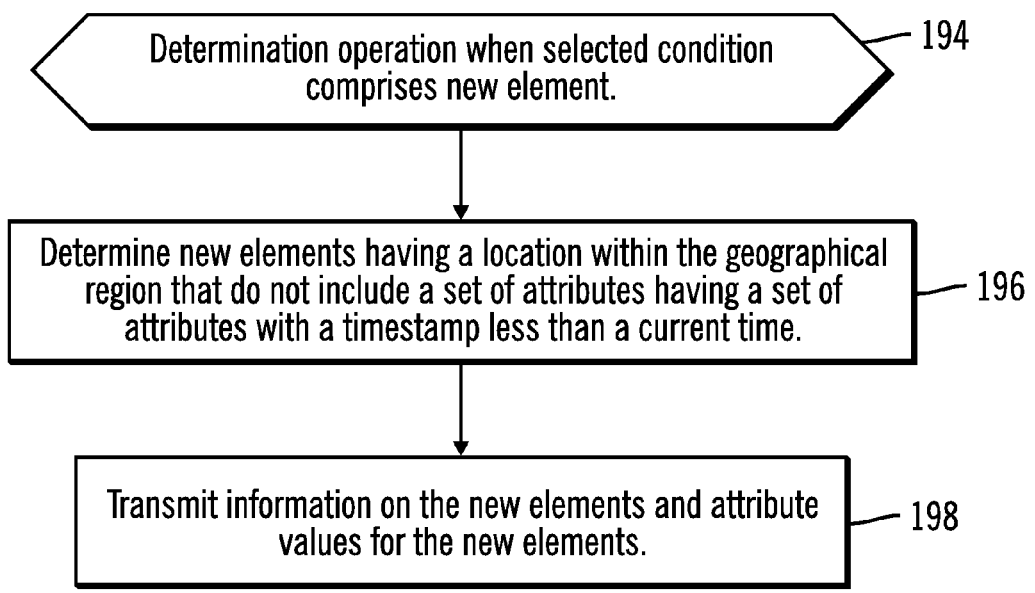
FIG. 12 illustrates an embodiment of operations to determine new elements for a geographical location.

FIGS. 10-12 provide embodiments of operations for different types of conditions that are applied at block 154 in FIG. 9 to select elements satisfying the conditions.

FIG. 10 illustrates an embodiment of operations when the selected condition at block 144 in FIG. 9 specifies as criteria 96 attribute values that have changed from the previous time to the most recent time. Upon initiating the determination (at block 170), the information manager 8 determines (at block 172), for each selected attribute, the selected attribute value in the determined previous set $56_{n-1}$ that differs from a corresponding selected attribute value in the most recent set $56_n$. Information may then be rendered for an element on those attributes whose values have changed between the timestamps 60 of the most recent set and the previous set. This allows the customer service representative using the device 4a, 4b, 4c to determine which customer sites to visit based on their changed purchasing decisions or changes in their profile, such as number of residents at location, number of employees, income change, etc.

FIG. 11 illustrates an embodiment of a determination operation when the selected condition at block 144 in FIG. 9 specifies as criteria changed attributes that were last visited by the customer service representative. Upon initiating (at block 180) the determination, a determination is made (at block 184) as to whether the visited attribute 62 and timestamp 60 for the previous set $56_{n-1}$ indicate that the element has not been visited for a predetermined time. If (at block 184) the element has not been visited or serviced for a predetermined time, then the information manager 8 determines (at block 186) for each selected attribute, whether the selected attribute satisfies the criteria 96 with respect to the attribute value 94 of the condition 90. The information manager 8 then transmits (at block 188) to the portable computing device 4a, 4b, 4c initiating the request the selected attributes that satisfy the condition criteria for the determined elements that have not been visited for a predetermined time. If (at block 184) the location of the element has been visited within the predetermined time, then control proceeds to block 156 in FIG. 9 to consider the next determined element.

For instance, the condition may cause selection of elements having attribute values that satisfy the criteria, such as attributes indicating that the visited customer element has purchased a certain product, purchased a certain product within a certain amount of time, has a profile satisfying a condition and value, such as income profile, age, occupation, number of residents at element location, number of employees, etc. Further, the condition may specify that the customer represented by the element 50 has attributes indicating that the customer not been visited within a certain time and has experienced a profile change since the last visit.

FIG. 12 illustrates an embodiment of determination operations performed at block 144 in FIG. 9 to determine new elements in the reference geographical region. Upon initiating (at block 194) the determination, the information manager 8 determines (at block 196) new elements having a geographical location 54 within the reference geographical region that do not include a set of attributes having a set of attributes with a timestamp less than a current time. The information on the new elements and their attribute values are transmitted (at block 198) to the portable electronic device 4a, 4b, 4c.

Figure 13:
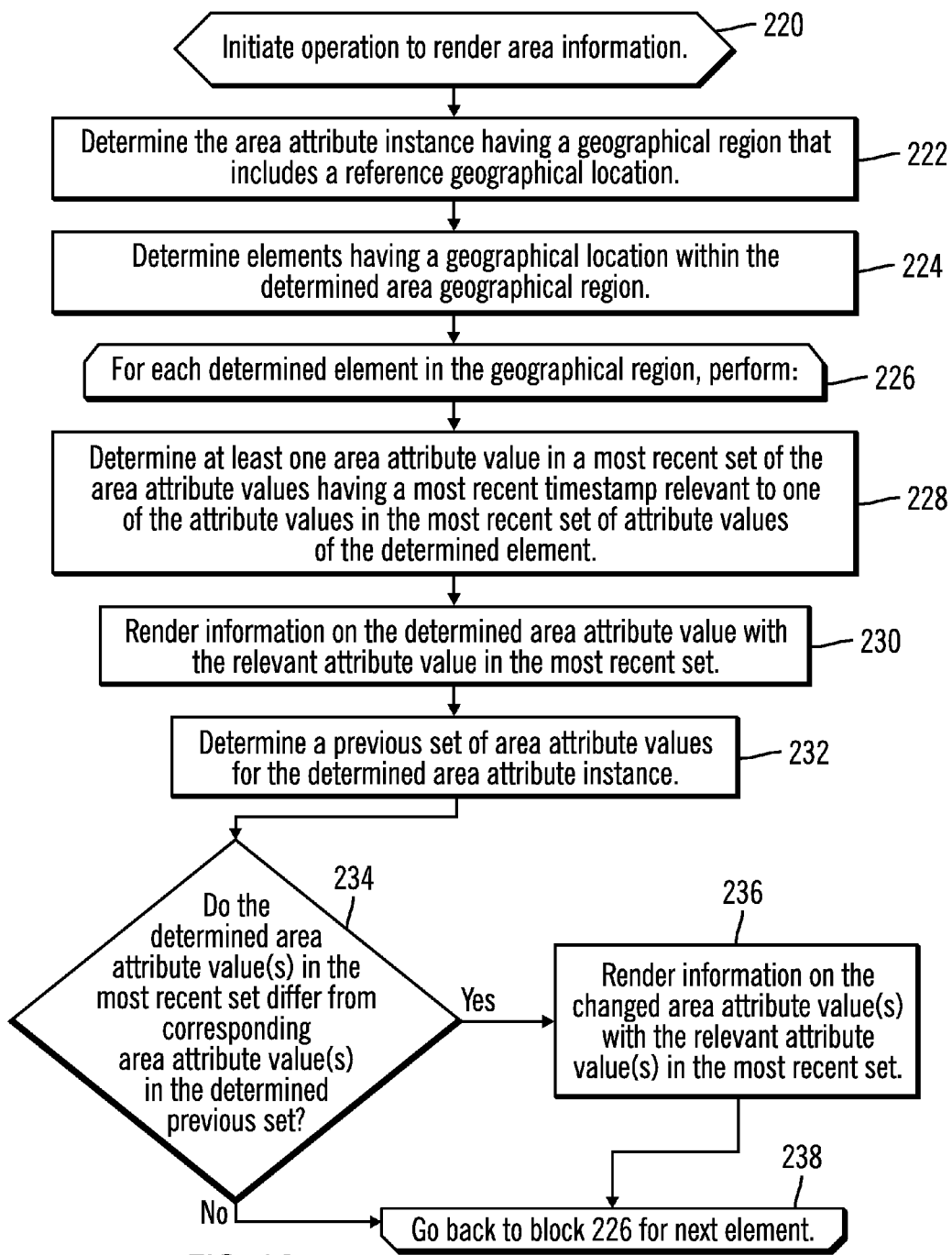
FIG. 13 illustrates an embodiment of operations to determine and render area information.

FIG. 13 illustrates an embodiment of operations performed by the information manager 8 to render area information using one or more area attribute conditions 100. Upon initiating (at block 220) the operations, the information manager 8 determines (at block 222) the area attribute instance 70 having a geographical region 72 that includes a reference geographical location, which may comprise the geographical location of the portable computing device 4a, 4b, 4c initiating the information request. A determination is further made (at block 224) of all elements 50 having a geographical location 54 within the area geographical region 72. The information manager 8 then performs a loop of operations at block 226 through 238 for each determined element in the determined area geographical region 72. At block 228, the information manager 8 determines at least one area attribute value $84a \ldots 84n$ in a most recent set of the area attribute values $74_n$ having a most recent timestamp 82 relevant to one of the attribute values in the most recent set of attribute values $56_n$ of the determined element. The determined information on the determined area attribute value with the relevant attribute value in the most recent set is rendered (at block 230) to be transmitted to the portable computing device 4a, 4b, 4c, such as rendered in a document or page to transmit. In certain embodiments an area attribute condition 100 (FIG. 7) may be used to select an area attribute relevant to one of the element attributes by considering whether the area attribute 106 value and element attribute 102 values satisfy the indicated condition 110. The condition 110 may utilize data mining algorithms to select area attribute values relevant to element attribute values for a considered element 50 and area attribute instance 70.

In embodiments where the elements 50 represent customers and the attribute values $64 \ldots 64n$ include profile attributes of the customers and products the customers have purchased and the area attribute values comprise demographic trends in the geographical region of the area attribute instance, determining one area attribute value relevant to one of the element attribute values may comprise determining the demographic trends in the area attribute instance relevant to at least one of the profile, product and purchasing attributes of the customer in the geographical region.

The information manager 8 further determines (at block 232) a previous set of area attribute values $74_{n-1}$ for the determined area attribute instance 70. A determination is made (at block 234) as to whether the determined area attribute value in the most recent set $74_n$ differs from the corresponding area attribute value in the determined previous set $74_{n-1}$. If the area attribute values have changed since the previous time the attribute values were recorded in the previous set $74_{n-1}$, then the information manager 8 renders (at block 236) information on the changed area attribute value with the relevant attribute value in the most recent set $74_n$. The rendered information at blocks 230 and 236 is transmitted to the portable computing device 4a, 4b, 4c to present to the user in the form of a page, document, etc.

The described embodiments maintain a history of the user's location and the data at the time of each visit to the locations as recorded in a previous set of attribute values 56a ... 56n for each element visited. When a portable computing device 4a, 4b, 4c enters a region to service, then a set of attribute values $56n$ for the elements in the region may be created having a current timestamp. This allows a comparison of previously recorded data in a previous attribute set $56_{n-1}$ to determine attributes or customer data that has changed and should be considered by the user of the portable computing device 4a, 4b, 4c. The history data will be available to any user of a portable computing device 4a, 4b, 4c intending to service the elements.

For, instance the described embodiments may be used by a door-to-door sales person who visits different neighborhoods and regions. While the sales person visits a region previously visited, the following information can be presented on the portable computing device 4a, 4b, 4c to present neighborhoods and customers, represented by elements 50, that the salesperson visited or not visited last time. The information manager 8 may also gather and present information on regions, or neighborhoods, having highest home sales, which can be determined from the area information instance 70 for the region of interest or product sales as determined from area information instance 70 or element information 50. A salesperson using the portable computing device 4a, 4b, 4c visits a neighborhood defined by a geographic region that was previously visited, and the information manager 8 may provide to the portable computing device 4a, 4b, 4c customers, represented by elements 50, rated top purchases according to attribute values, including identifying the customer element on a map and potential customers based on their previous purchases as indicated in element attribute values $64a \ldots 64n$.

Further, when the portable computing device 4a, 4b, 4c passes within a defined distance of a geographical location 54 of an element 58, the information manger 8 may provide a push notification of information on the element, such as whether an owner of the residence or business represented by the element 50 has changed since last time indicating a potential new customer, such as by using the difference determination of FIG. 10; whether a person was visited at the time of a last visit, which may be indicated in an attribute value of the previous set of attributes for the elements; and whether an item was sold which may need replacement parts, which may be determined according to FIG. 11.

In another example, car insurance brokers from the same company may have a comparison done of area attribute values, as in FIG. 13, to determine demographic changes relevant to customer insurance policies, such as number of car accidents and thefts, which may help the insurance agent tailor policies being offered to the general area risks, as well as user specific risks. For instance, the area attribute information presented may be tailored to the customer attributes, such as to determine area information attributes, e.g., demographics, relevant to the customer attributes, i.e., products purchased, as performed in FIG. 13. For instance, if the customer, as presented by an element, has a sports car, then the information manager 8 may determine area information relevant to sports cars, such as theft and accident statistics for sports cars, and how those statistics have changed since the previous visit.

This provides information to the user of the portable computing device 4a, 4b, 4c that allows them to tailor the products they offer to the anticipated needs of the customers.

In described embodiments the operations to process the element 50 and area information instances 70 in FIGS. 8-13 were described as performed by the information manager 8. However, in alternative embodiments, the information client 22 in the portable computing devices 4a, 4b, 4c may perform some or all of the operations of FIGS. 8-13 after downloading from the database 14 the relevant element information 10 and area information 12 for the geographical location of the portable computing device 4a, 4b, 4c.

In the described embodiments, the reference geographical location used to determine the relevant element and area attributes is determined from a geographical location of a portable computing device used in the field to present information to the user while traveling through the region. In further embodiments, a user may enter the geographical location from a different location to obtain reports including information on elements, attributes of elements, and area attributes relevant to elements the user plans to visit when travelling to the geographical region in the future. In this way, the user may generate the reports from a desktop computer or other system at one location and use the reports and information to plan ahead before visiting the geographical region.

Described embodiments provide techniques to record attributes for elements and areas which include the elements at different points-in-time, and then use that information to determine useful information on elements to present to a user of a portable electronic device while the user and portable computing device are located in a geographical region including various elements.

Cloud Computing Embodiments

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 14-16. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 14:
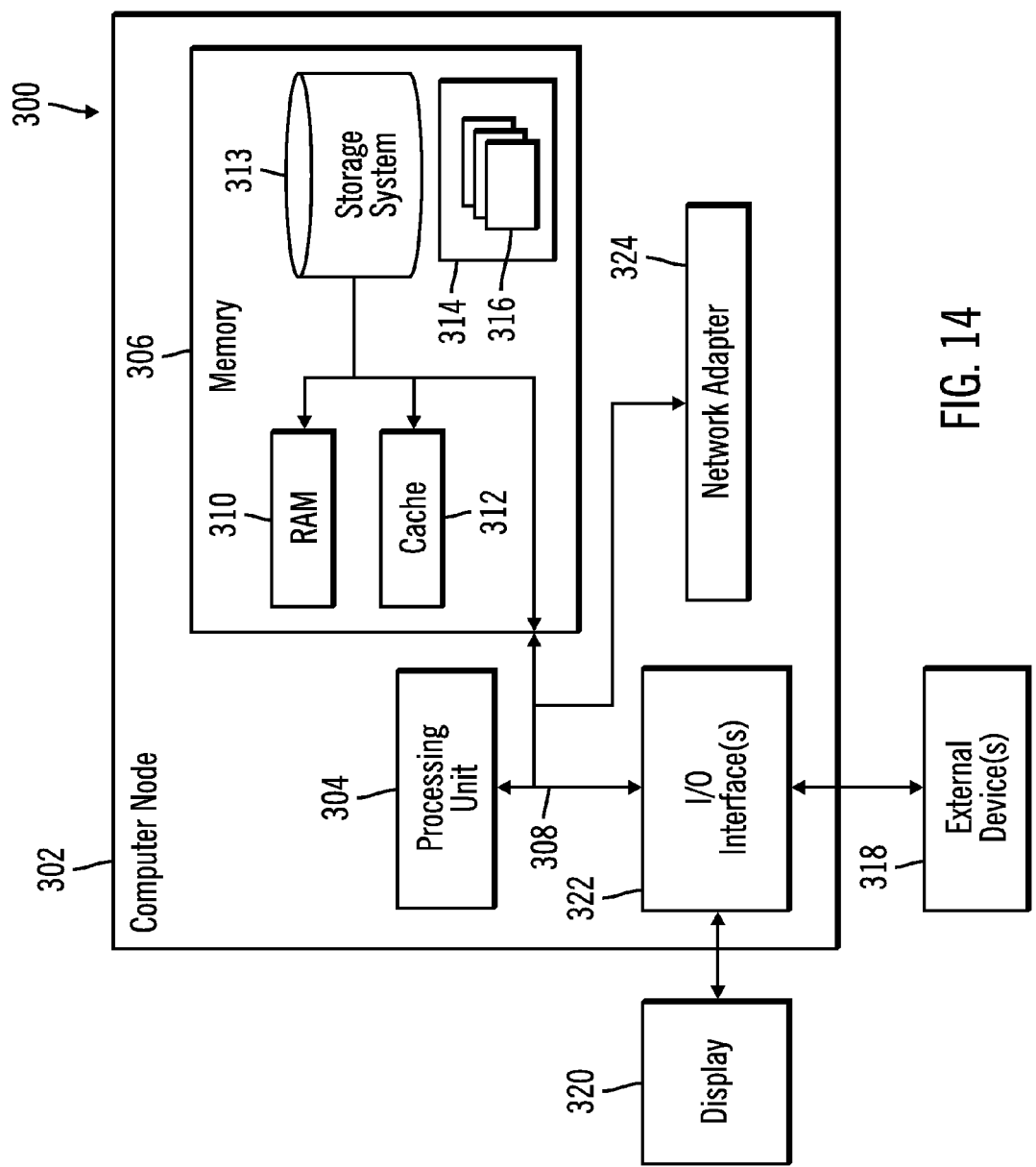
FIG. 14 illustrates an implementation of a node in the network computing embodiment.

FIG. 14 illustrates an embodiment of a cloud computing node 300 which may comprise an implementation of the server 2 and computing devices 4a, 4b, 4c, which may be implemented in one or more of the nodes 300. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 302 in cloud computing node 300 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 15:
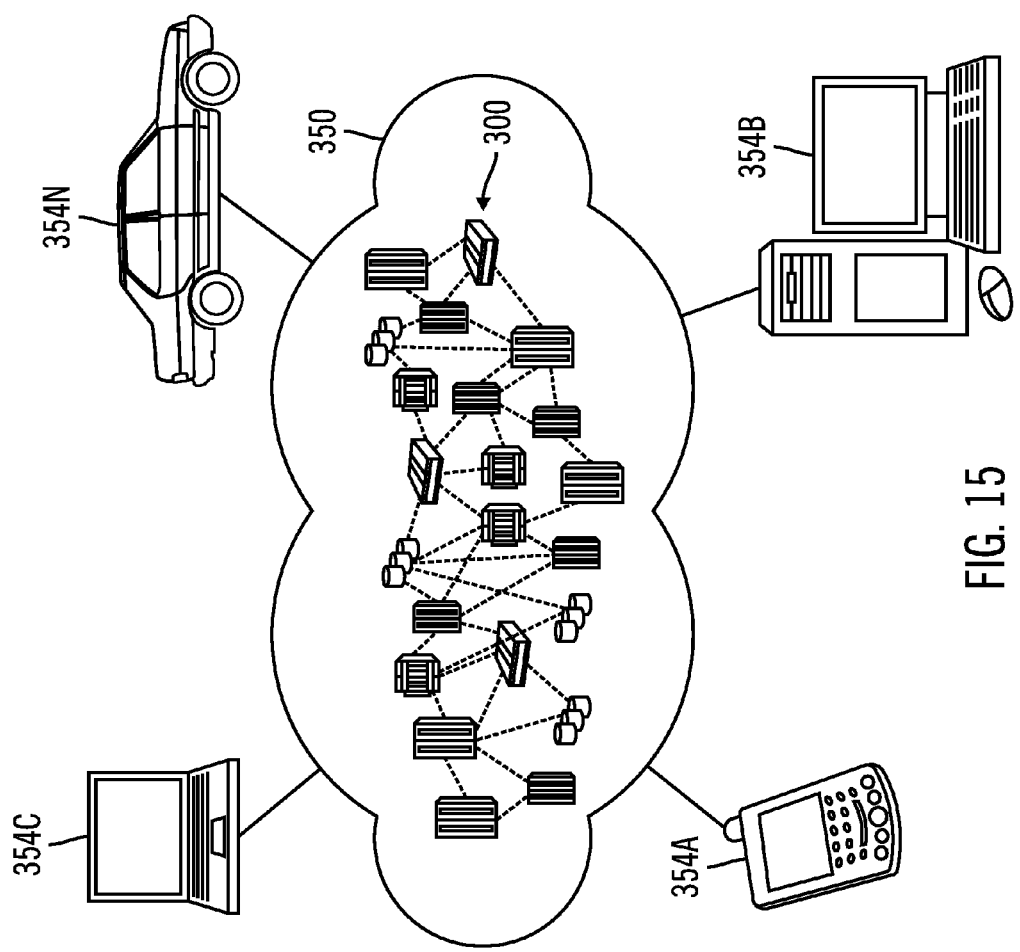
FIG. 15 illustrates an embodiment of a cloud computing environment.

Referring now to FIG. 15, illustrative cloud computing environment 350 is depicted. As shown, cloud computing environment 350 comprises one or more cloud computing nodes 300 with which local computing devices used by cloud consumers, such as, for example, personal digital assistant (PDA) or cellular telephone 354A, desktop computer 354B, laptop computer 354C, and/or automobile computer system 354N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 15 are intended to be illustrative only and that computing nodes 300 and cloud computing environment 350 can communicate with any type of computerized device over any type of network and/or network addressable connection (e.g., using a web browser).

Figure 16:
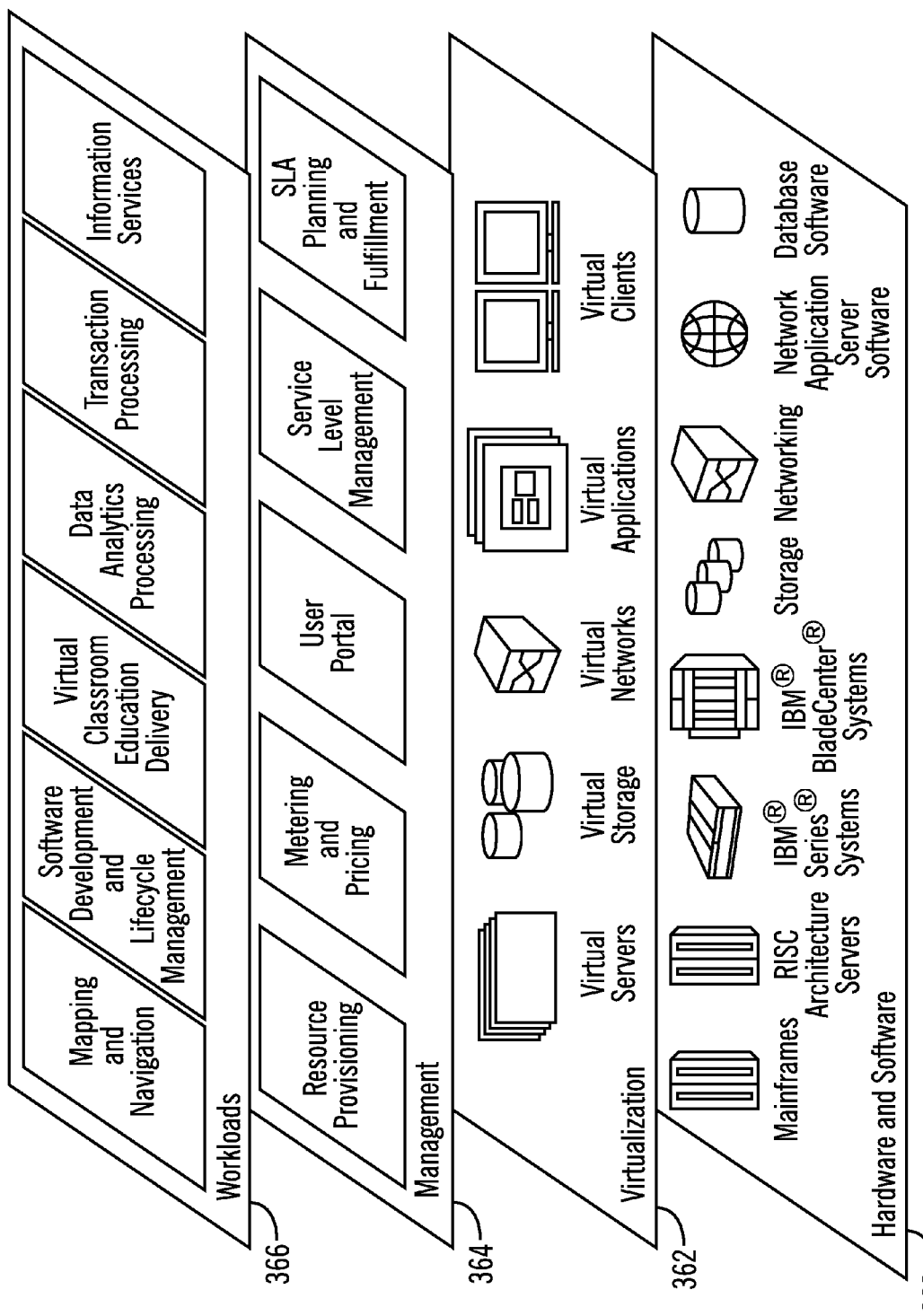
FIG. 16 illustrates an embodiment of abstraction model layers of a cloud computing environment.

Referring now to FIG. 16, a set of functional abstraction layers provided by cloud computing environment 350 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual sources.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the information services, such as described with respect to FIGS. 1-13, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 8-13 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    generating in a database in a computer readable storage medium a plurality of elements, where each element is associated with a location and at least one set of different attribute values, wherein each set includes a timestamp when the attribute values in the set were determined;
    determining a reference geographical location;
    determining an element having a geographical location within a geographical region including the referenced geographical location;
    determining a most recent set of the attribute values for the element having a most recent timestamp, wherein the attribute values comprise at least one of profile information for the element and purchasing decisions for the element;
    determining a previous set of attribute values for the determined element comprising the set of attribute values having a previous timestamp prior to the most recent timestamp;
    determining whether a condition, specifying criteria concerting a difference in the most recent set of attribute values and the previous set of attribute values of the determined element, is satisfied, wherein the difference is with respect to the same set of attribute values at different times including the most recent timestamp and the previous timestamp; and
    rendering information on the difference of the most recent set and the previous set of attributes values for the determined element in response to determining that the condition is satisfied.

2. The method of claim 1, wherein the previous timestamp is closest in time to the most recent timestamp of timestamps in sets of attribute values, wherein the condition is satisfied when at least one attribute value in the determined previous set differs from a corresponding attribute value in the most recent set, wherein rendering the information comprises rendering information on the attribute values in the most recent set and the previous set that differ.

3. The method of claim 1, further comprising:
    determining a location of a portable computing device, wherein the received selected location comprises the determined location of the portable computing device, and wherein the rendered information is rendered at the portable computing device while located in the geographical region.

4. The method of claim 3, wherein a visited attribute value in the sets indicates whether a user of the portable computing device visited the location of the element, wherein determining the element comprises determining elements having the visited attribute value indicating that the user of the portable device visited the location of the element.

5. The method of claim 3, wherein the elements represent customers and the attribute values include profile attributes of the customers and products the customers have purchased, wherein determining whether the condition is satisfied comprises determining whether the attributes of the products the customers have purchased satisfy a purchasing condition.

6. The method of claim 1, wherein the operations further comprise:
    generating in the database a plurality of area information instances, wherein each area information instance is associated with a geographical region and at least one set of area attribute values, wherein each set includes a timestamp of the area attribute values in the set;

determining the area attribute instance having a geographical region that includes the reference geographical location;

determining one area attribute value in a most recent set of the area attribute values having a most recent timestamp relevant to one of the attribute values in the most recent set of the determined element; and rendering information on the determined area attribute value with the relevant attribute value in the most recent set.

7. A computer program product for providing location based information, the computer program product comprising a non-transitory computer readable storage medium having computer readable program code embodied therein that executes to perform operations, the operations comprising:

generating in a database a plurality of elements, where each element is associated with a location and at least one set of different attribute values, wherein each set includes a timestamp when the attribute values in the set were determined;

determining a reference geographical location;

determining an element having a geographical location within a geographical region including the referenced geographical location;

determining a most recent set of the attribute values for the element having a most recent timestamp, wherein the attribute values comprise at least one of profile information for the element and purchasing decisions for the element;

determining a previous set of attribute values for the determined element comprising the set of attribute values having a previous timestamp prior to the most recent timestamp;

determining whether a condition, specifying criteria concerning a difference in the most recent set of attribute values and the previous set of attribute values of the determined element, is satisfied, wherein the difference is with respect to the same set of attribute values at different times including the most recent timestamp and the previous timestamp; and rendering information on the difference of the most recent set and the previous set of attribute values of the determined element in response to determining that the condition is satisfied.

8. The computer program product of claim 7, wherein the previous timestamp is closest in time to the most recent timestamp of timestamps in sets of attribute values, wherein the condition is satisfied when at least one attribute value in the determined previous set differs from a corresponding attribute value in the most recent set, wherein rendering the information comprises rendering information on the attribute values in the most recent set and the previous set that differ.

9. The computer program product of claim 7, wherein the operations further comprise:

determining a location of a portable computing device, wherein the received selected location comprises the determined location of the portable computing device, and wherein the rendered information is rendered at the portable computing device while located in the geographical region.

10. The computer program product of claim 9, wherein at least one user of at least one portable computing device visits the elements in the geographical region, and wherein the sets of attribute values for each element provide attribute values set when the at least one user of the at least one portable computing device visited the geographical region of the elements.

11. The computer program product of claim 9, wherein a visited attribute value in the sets indicates whether a user of the portable computing device visited the location of the element, wherein determining the element comprises determining elements having the visited attribute value indicating that the user of the portable device visited the location of the element.

12. The computer program product of claim 11, wherein the operations further comprise:

determining visited elements in the geographical region having the visited attribute value for the previous set indicating that the user of the portable device visited the location of the element more than a predetermined time period from the timestamp of the previous set, wherein the condition specifies criteria for the most recent and previous sets of attribute values for the determined visited elements, and wherein the rendered information is rendered for the attribute values of the determined visited elements.

13. The computer program product of claim 9, wherein the elements represent customers and the attribute values include profile attributes of the customers and products the customers have purchased, wherein determining whether the condition is satisfied comprises determining whether the attributes of the products the customers have purchased satisfy a purchasing condition.

14. The computer program product of claim 13, wherein the purchasing condition selects customers whose attributes indicate at least one of: a potential for purchasing a new product; a need to purchase a replacement product based on attributes of the products purchased and the timestamp of the previous set; valued customer whose attributes indicating products purchased satisfies a purchasing threshold; a change of a profile characteristic of the customer at the geographical location of the customer element.

15. The computer program product of claim 7, wherein the operations further comprise:

determining new elements having a location within the geographical region that do not include a set of attributes having a set of attributes with a timestamp less than a current timestamp; and rendering information on the new elements and attribute values for the new elements.

16. The computer program product of claim 7, wherein the operations further comprise:

generating in the database a plurality of area information instances, wherein each area information instance is associated with a geographical region and at least one set of area attribute values, wherein each set includes a timestamp of the area attribute values in the set;

determining the area attribute instance having a geographical region that includes the reference geographical location;

determining one area attribute value in a most recent set of the area attribute values having a most recent timestamp relevant to one of the attribute values in the most recent set of the determined element; and rendering information on the determined area attribute value with the relevant attribute value in the most recent set.

17. The computer program product of claim 16, wherein the operations further comprise:

determining a previous set of area attribute values for the determined area attribute instance; and determining whether the determined area attribute value in the most recent set differs from corresponding area attribute value in the determined previous set, wherein the rendering of the information on the determined area attribute value is performed in response to determining that the determined area attribute value in the most recent set differs from the corresponding area attribute value.

18. The computer program product of claim 16, wherein the elements represent customers and the attribute values include profile attributes of the customers and products the customers have purchased and wherein the area attribute values comprise demographic trends in the geographical region of the area attribute instance, wherein determining one area attribute value relevant to one of the attribute values comprises determining at least one of the demographic trends in the area attribute instance relevant to at least one of the profile attributes and products of the customers in the geographical region.

19. A system in communication with a database, comprising:
    a processor;
    a computer readable storage medium having computer readable program code embodied therein that is executed by the processor to perform operations, the operations comprising:
        generating in the database a plurality of elements, where each element is associated with a location and at least one set of different attribute values, wherein each set includes a timestamp when the attribute values in the set were determined;
        determining a reference geographical location;
        determining an element having a geographical location within a geographical region including the referenced geographical location;
        determining a most recent set of the attribute values for the element having a most recent timestamp, wherein the attribute values comprise at least one of profile information for the element and purchasing decisions for the element;
        determining a previous set of attribute values for the determined element comprising the set of attribute values having a previous timestamp prior to the most recent timestamp;
        determining whether a condition, specifying criteria concerning a difference in the most recent set of attribute values and the previous set of attribute values of the determined element, is satisfied, wherein the difference is with respect to the same set of attribute values at different times including the most recent timestamp and the previous timestamp; and
        rendering information on the difference of the most recent set and the previous set of attribute values of the determined element in response to determining that the condition is satisfied.

20. The system of claim 19, wherein the previous timestamp is closest in time to the most recent timestamp of timestamps in sets of attribute values, wherein determining whether the condition is satisfied when at least one attribute value in the determined previous set differs from a corresponding attribute value in the most recent set, wherein rendering the information comprises rendering information on the attribute values in the most recent set and the previous set that differ.

21. The system of claim 19, wherein the operations further comprise:
    determining a location of a portable computing device, wherein the received selected location comprises the determined location of the portable computing device, and wherein the rendered information is rendered at the portable computing device while located in the geographical region.

22. The system of claim 21, wherein a visited attribute value in the sets indicates whether a user of the portable computing device visited the location of the element, wherein determining the element comprises determining elements having the visited attribute value indicating that the user of the portable device visited the location of the element.

23. The system of claim 21, wherein the elements represent customers and the attribute values include profile attributes of the customers and products the customers have purchased, wherein determining whether the condition is satisfied comprises determining whether the attributes of the products the customers have purchased satisfy a purchasing condition.

24. The system of claim 19, wherein the operations further comprise:
    generating in the database a plurality of area information instances, wherein each area information instance is associated with a geographical region and at least one set of area attribute values, wherein each set includes a timestamp of the area attribute values in the set;
    determining the area attribute instance having a geographical region that includes the reference geographical location;
    determining one area attribute value in a most recent set of the area attribute values having a most recent timestamp relevant to one of the attribute values in the most recent set of the determined element; and
    rendering information on the determined area attribute value with the relevant attribute value in the most recent set.

* * * * *